(12) United States Patent
Suzuki et al.

(10) Patent No.: US 11,347,141 B2
(45) Date of Patent: May 31, 2022

(54) LIGHT SOURCE DEVICE AND PROJECTOR

(71) Applicant: SEIKO EPSON CORPORATION, Tokyo (JP)

(72) Inventors: Junichi Suzuki, Matsumoto (JP); Hidefumi Sakata, Kamiina-gun (JP); Shingo Komiyama, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/208,600

(22) Filed: Mar. 22, 2021

(65) Prior Publication Data
US 2021/0294201 A1    Sep. 23, 2021

(30) Foreign Application Priority Data

Mar. 23, 2020  (JP) .............................. JP2020-051191
Sep. 3, 2020  (JP) .............................. JP2020-148342

(51) Int. Cl.
G03B 33/12    (2006.01)
G03B 21/20    (2006.01)
G02B 27/28    (2006.01)

(52) U.S. Cl.
CPC ........... *G03B 33/12* (2013.01); *G02B 27/283* (2013.01); *G03B 21/204* (2013.01); *G03B 21/208* (2013.01)

(58) Field of Classification Search
CPC ..... G03B 33/12; G03B 21/208; G02B 27/283
USPC .......................................................... 353/31
See application file for complete search history.

(56) References Cited

U.S. PATENT DOCUMENTS

| 2009/0078949 A1 | 3/2009 | Bechtel et al. |
| 2017/0075203 A1* | 3/2017 | Cheng .................. G03B 21/208 |
| 2018/0217486 A1 | 8/2018 | Tanaka |
| 2019/0041739 A1 | 2/2019 | Kamijima et al. |
| 2020/0026172 A1 | 1/2020 | Sakata et al. |

FOREIGN PATENT DOCUMENTS

| JP | 2008-521233 A | 6/2008 |
| JP | 2017-167415 A | 9/2017 |
| JP | 2018-124538 A | 8/2018 |
| JP | 2019-032352 A | 2/2019 |
| JP | 2020-013058 A | 1/2020 |

* cited by examiner

*Primary Examiner* — Jerry L Brooks
(74) *Attorney, Agent, or Firm* — Oliff PLC

(57) ABSTRACT

A light source device according to the present disclosure includes a first light source, a second light source, a wavelength conversion section, a polarization splitting/combining element, a dichroic mirror for reflecting second light and transmitting third light emitted from the wavelength conversion section, a retardation plate, a diffusion section, and a condensing optical section. Condensing optical section has a first end part, a second end part, and a reflecting part. Second light proceeding via the polarization splitting/combining element is transmitted through the condensing optical section from the second end part toward the first end part, and then enters the dichroic mirror. Second light reflected by the dichroic mirror passes through the condensing optical section and then enters the polarization splitting/combining element. Third light passes through the condensing optical section and then enters the polarization splitting/combining element. Polarization splitting/combining element combines the second light and the third light with each other.

12 Claims, 8 Drawing Sheets

LIGHT SOURCE DEVICE AND PROJECTOR

The present application is based on, and claims priority from JP Application Serial Number 2020-051191, filed Mar. 23, 2020, and JP Application Serial Number 2020-148342, filed Aug. 2, 2017, the disclosure of which is hereby incorporated by reference herein in its entirety.

BACKGROUND

1. Technical Field

The present disclosure relates to a light source device and a projector.

2. Related Art

As a light source device used for a projector, there is proposed a light source device using fluorescence which is emitted from a phosphor when irradiating the phosphor with excitation light emitted from a light emitting element. In JP-T-2008-521233 (the term "JP-T" as used herein means a published Japanese translation of a PCT patent application), there is disclosed a light source device which is provided with a wavelength conversion member including a phosphor and shaped like a flat plate, and a light emitting diode (LED) for emitting the excitation light, and which makes the excitation light enter the wavelength conversion member from a surface large in area out of a plurality of surfaces of the wavelength conversion member to emit the converted light from a surface small in area of the wavelength conversion member.

When generating illumination light having a white color in a related-art light source device, since a blue light source unit for generating blue light becomes necessary in addition to a light source unit for emitting the fluorescence, there is a problem that a device configuration grows in size.

SUMMARY

In view of the problems described above, according to a first aspect of the present disclosure, there is provided a light source device including a first light source configured to emit first light having a first wavelength band, a second light source configured to emit second light having a second wavelength band, a wavelength conversion section which includes a phosphor, and which is configured to convert the first light emitted from the first light source into third light in a third wavelength band different from the first wavelength band, a polarization splitting/combining element which is disposed in a light path of the second light, and which has a polarization splitting function with respect to the second light, a dichroic mirror configured to reflect the second light which is emitted from the second light source and which proceeds via the polarization splitting/combining element, toward the polarization splitting/combining element, and transmit the third light emitted from the wavelength conversion section, a retardation plate disposed between the polarization splitting/combining element and the dichroic mirror in the light path of the second light, a diffusion section disposed between the polarization splitting/combining element and the dichroic mirror in the light path of the second light, and a condensing optical section configured to collect the third light which is emitted form the wavelength conversion section and is transmitted through the dichroic mirror, and the second light reflected by the dichroic mirror, wherein the condensing optical section includes a first end part, a second end part, and a reflecting part configured to reflect incident light, the second light which is emitted from the second light source and proceeds via the polarization splitting/combining element enters the condensing optical section through the second end part, passes through the condensing optical section, and is emitted from the first end part, and enters the dichroic mirror, the second light which is reflected by the dichroic mirror enters the condensing optical section through the first end part, passes through the condensing optical section, and is emitted from the second end part, and enters the polarization splitting/combining element, the third light which is emitted from the wavelength conversion section and is then transmitted through the dichroic mirror enters the condensing optical section through the first end part, passes through the condensing optical section, and is emitted from the second end part, and enters the polarization splitting/combining element, and the polarization splitting/combining element combines the second light reflected by the dichroic mirror and the third light emitted from the wavelength conversion section with each other to generate composite light.

According to a second aspect of the present disclosure, there is provided a projector including the light source device according to the first aspect of the present disclosure, a light modulation device configured to modulate light from the light source device in accordance with image information, and a projection optical device configured to project the light modulated by the light modulation device.

DESCRIPTION OF EXEMPLARY EMBODIMENTS

Some embodiments of the present disclosure will hereinafter be described using the drawings.

A projector according to the present embodiment is an example of a projector using liquid crystal panels as light modulation devices.

It should be noted that in each of the drawings described below, the constituents are shown with the scale ratios of respective sizes set differently between the constituents in some cases in order to facilitate the visualization of each of the constituents.

First Embodiment

Figure 1:
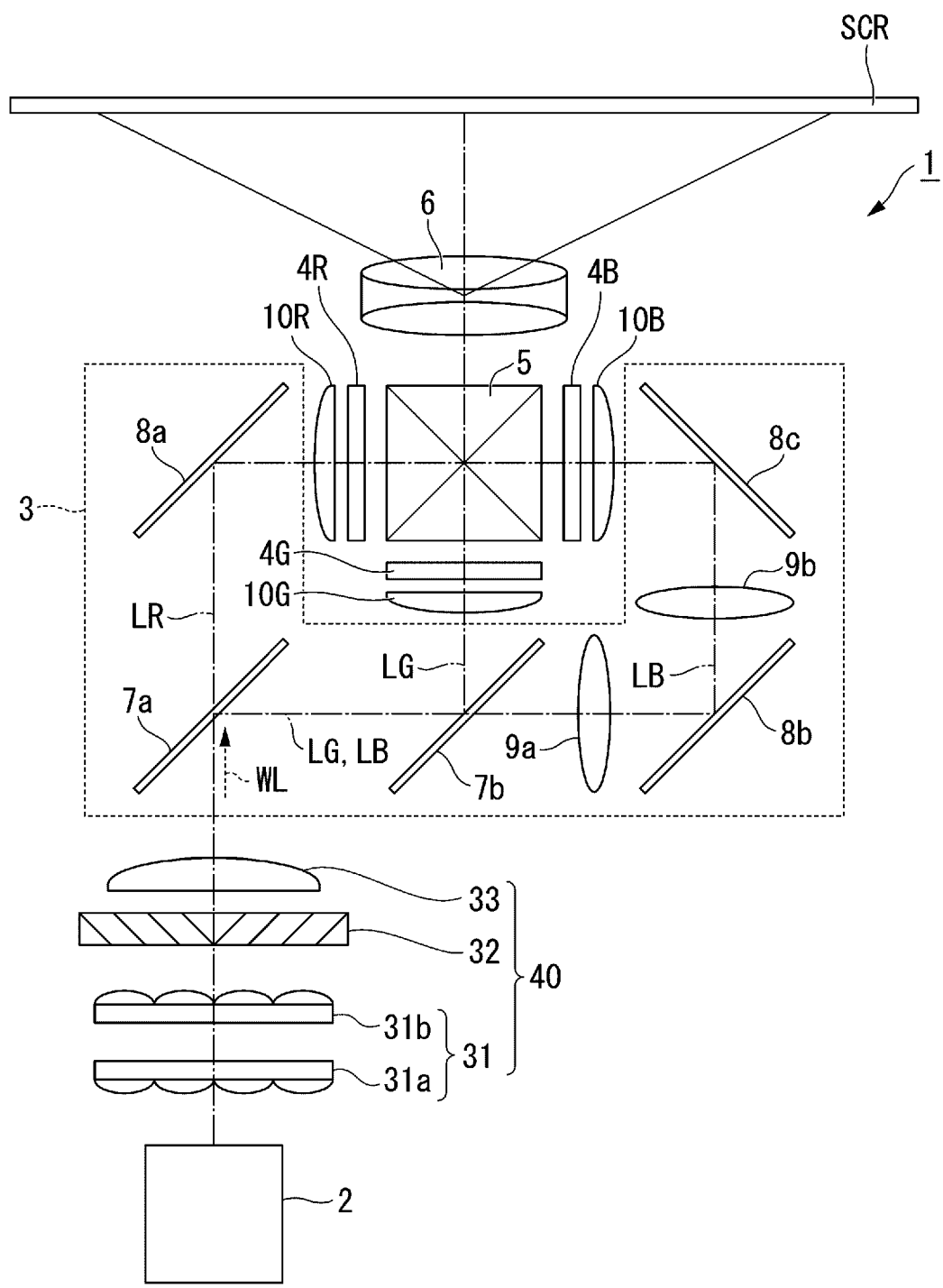
FIG. 1 is a diagram showing a configuration of a projector according to a first embodiment.

FIG. 1 is a diagram showing a configuration of the projector according to the present embodiment.

The projector 1 according to the present embodiment shown in FIG. 1 is a projection-type image display device for displaying a color image on a screen (a projection target surface) SCR. The projector 1 uses three light modulation devices corresponding to respective colored light beams, namely red light LR, green light LG, and blue light LB.

The projector 1 is provided with a light source device 2, a homogeneous illumination optical system 40, a color separation optical system 3, a light modulation device 4R, a light modulation device 4G, a light modulation device 4B, a combining optical system 5, and a projection optical device 6.

The light source device 2 emits illumination light WL toward the homogeneous illumination optical system 40. The detailed configuration of the light source device 2 will be described later in detail.

The homogeneous illumination optical system 40 is provided with an integrator optical system 31, a polarization conversion element 32, and a superimposing optical system 33. The integrator optical system 31 is provided with a first lens array 31a and a second lens array 31b. The polarization conversion element 32 converts a polarization direction of the light emitted from the integrator optical system 31. Specifically, the polarization conversion element 32 converts each of the partial light beams which are divided into by the first lens array 31a, and are emitted from the second lens array 31b into linearly polarized light. The polarization conversion element 32 has a polarization splitting layer for transmitting one of the linearly polarized components included in the illumination light WL emitted from the light source device 2 without modification while reflecting the other of the linearly polarized components toward a direction perpendicular to the light axis, a reflecting layer for reflecting the other of the linearly polarized components reflected by the polarization splitting layer, toward a direction parallel to the light axis, and a retardation plate for converting the other of the linearly polarized components reflected by the reflecting layer into the one of the linearly polarized components. The superimposing optical system 33 homogenizes the illuminance distribution due to the illumination light WL in the illumination target area in cooperation with the integrator optical system 31.

In such a manner, the homogeneous illumination optical system 40 homogenizes the intensity distribution of the illumination light WL emitted from the light source device 2 in each of the light modulation device 4R, the light modulation device 4G, and the light modulation device 4B as illumination target areas. The illumination light WL having been emitted from the homogeneous illumination optical system 40 enters the color separation optical system 3.

The color separation optical system 3 separates the illumination light WL having a white color into the red light LR, the green light LG, and the blue light LB. The color separation optical system 3 is provided with a first dichroic mirror 7a, a second dichroic mirror 7b, a first reflecting mirror 8a, a second reflecting mirror 8b, a third reflecting mirror 8c, a first relay lens 9a, and a second relay lens 9b.

The first dichroic mirror 7a separates the illumination light WL from the light source device 2 into the red light LR and the other light (the green light LG and the blue light LB). The first dichroic mirror 7a transmits the red light LR thus separated from, and at the same time reflects the other light (the green light LG and the blue light LB). Meanwhile, the second dichroic mirror 7b separates the other light into the green light LG and the blue light LB. The second dichroic mirror 7b reflects the green light LG thus separated from and transmits the blue light LB.

The first reflecting mirror 8a is disposed in the light path of the red light LR, and the red light LR which has been transmitted through the first dichroic mirror 7a is reflected by the first reflecting mirror 8a toward the light modulation device 4R. Meanwhile, the second reflecting mirror 8b and the third reflecting mirror 8c are disposed in the light path of the blue light LB, and the blue light LB which has been transmitted through the second dichroic mirror 7b is reflected by the second reflecting mirror 8b and the third reflecting mirror 8c toward the light modulation device 4B. Further, the green light LG is reflected by the second dichroic mirror 7b toward the light modulation device 4G.

The first relay lens 9a and the second relay lens 9b are disposed at the light exit side of the second dichroic mirror 7b in the light path of the blue light LB. The first relay lens 9a and the second relay lens 9b correct a difference in illuminance distribution of the blue light LB due to the fact that the blue light LB is longer in optical path length than the red light LR and the green light LG.

The light modulation device 4R modulates the red light LR in accordance with image information to form image light corresponding to the red light LR. The light modulation device 4G modulates the green light LG in accordance with the image information to form image light corresponding to the green light LG. The light modulation device 4B modulates the blue light LB in accordance with the image information to form image light corresponding to the blue light LB.

As the light modulation device 4R, the light modulation device 4G, and the light modulation device 4B, there are used, for example, transmissive liquid crystal panels. Further, at the incident side and the exit side of the liquid crystal panel, there are disposed polarization plates (not shown), respectively, and thus, there is formed a configuration of transmitting only the linearly polarized light with a specific direction.

At the incident side of the light modulation device 4R, the light modulation device 4G, and the light modulation device 4B, there are disposed a field lens 10R, a field lens 10G, and a field lens 10B, respectively. The field lens 10R, the field lens 10G, and the field lens 10B collimate principal rays of the red light LR, the green light LG, and the blue light LB which enter the light modulation device 4R, the light modulation device 4G, and the light modulation device 4B, respectively.

The combining optical system 5 combines the image light corresponding to the red light LR, the image light corresponding to the green light LG, and the image light corresponding to the blue light LB with each other in response to incidence of the image light respectively emitted from the light modulation device 4R, the light modulation device 4G, and the light modulation device 4B, and then emits the image light thus combined toward the projection optical device 6. As the combining optical system 5, there is used, for example, a cross dichroic prism.

The projection optical device 6 is constituted by a plurality of projection lenses. The projection optical device 6 projects the image light having been combined by the combining optical system 5 toward the screen SCR in an enlarged manner. Thus, an image is displayed on the screen SCR.

The light source device 2 will hereinafter be described.

Figure 2:
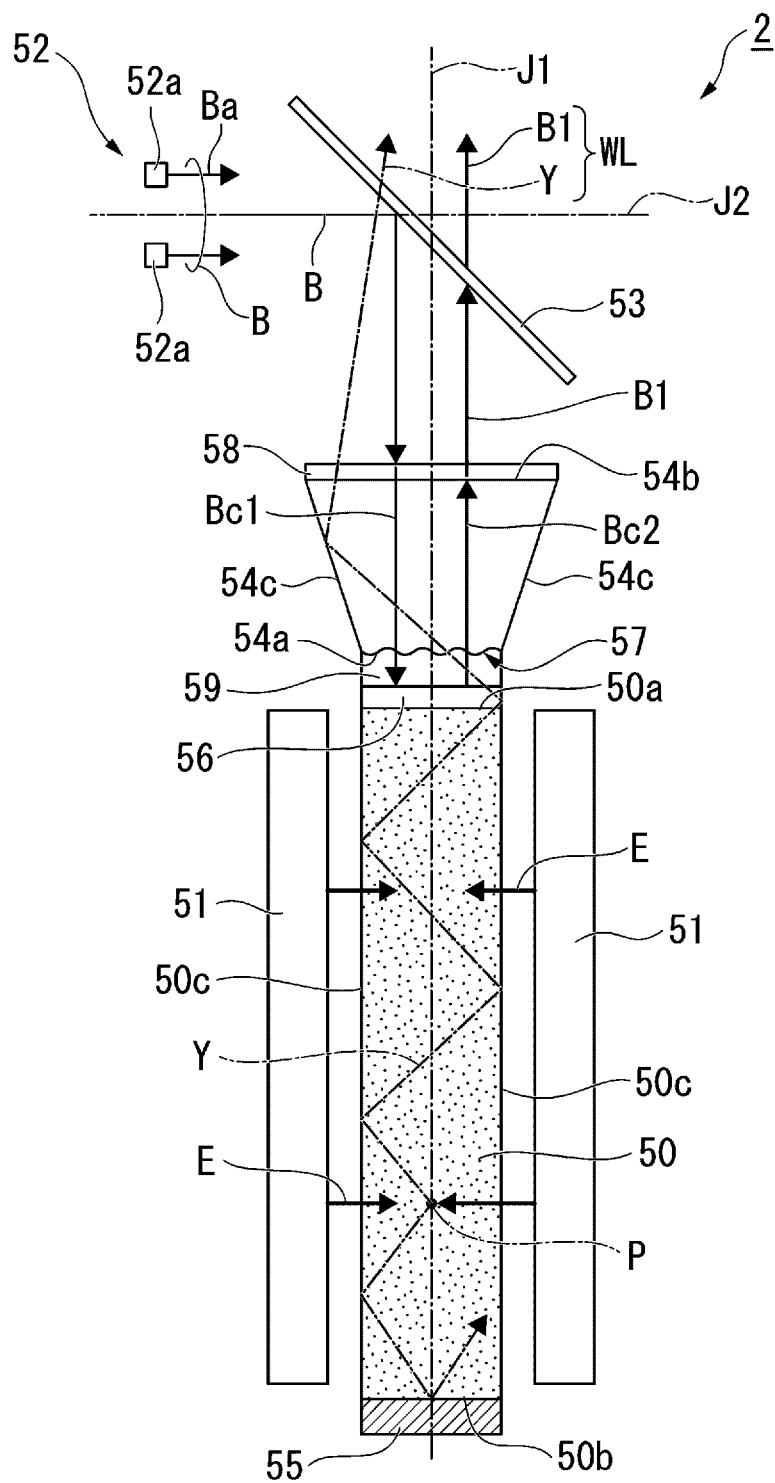
FIG. 2 is a schematic configuration diagram of a light source device.

FIG. 2 is a schematic configuration diagram of the light source device 2.

As shown in FIG. 2, the light source device 2 is provided with a wavelength conversion section 50, a first light source 51, a second light source 52, a polarization splitting/combining element 53, an angle conversion section (a condensing optical section) 54, a mirror 55, a dichroic mirror 56, a diffusion section 57, a retardation plate 58, and a bonding layer 59.

The wavelength conversion section 50 has a quadrangular prismatic shape, and has a first end part 50a and a second end part 50b opposed to each other, and four side surfaces 50c crossing the first end part 50a and the second end part 50b. The wavelength conversion section 50 includes at least a phosphor, and converts excitation light E in an excitation wavelength band into fluorescence (third light) Y having a third wavelength band different from a first wavelength band as the excitation wavelength band. In the wavelength conversion section 50, the excitation light E enters the wavelength conversion section 50 through the side surfaces 50c, and the fluorescence Y is emitted from the first end part 50a.

It should be noted that the wavelength conversion section 50 is not necessarily required to have the quadrangular prismatic shape, but can also have other polygonal shapes such as a triangular prismatic shape. Alternatively, it is also possible for the wavelength conversion section 50 to have a columnar shape.

The wavelength conversion section 50 includes a ceramic phosphor (polycrystalline phosphor) for converting the excitation light E in wavelength into the fluorescence Y. The wavelength band of the fluorescence Y is a yellow wavelength band of, for example, 490 through 750 nm. Therefore, the fluorescence Y is yellow fluorescence including a red light component and a green light component.

It is also possible for the wavelength conversion section 50 to include a single-crystal phosphor instead of the polycrystalline phosphor. Alternatively, the wavelength conversion section 50 can also be formed of fluorescent glass. Alternatively, the wavelength conversion section 50 can also be formed of a material obtained by dispersing a number of phosphor particles in a binder made of glass or resin. The wavelength conversion section 50 made of such a material converts the excitation light E into the fluorescence Y in the first wavelength band.

Specifically, the material of the wavelength conversion section 50 includes, for example, an yttrium aluminum garnet (YAG) phosphor. Citing YAG:Ce including cerium (Ce) as an activator agent as an example, as the material of the wavelength conversion section 50, there can be used a material obtained by mixing raw powder including constituent elements such as $Y_2O_3$, $Al_2O_3$ and $CeO_3$ to cause the solid-phase reaction, Y—Al—O amorphous particles obtained by a wet process such as a coprecipitation process or a sol-gel process, and YAG particles obtained by a gas-phase process such as a spray drying process, a flame heat decomposition process or a thermal plasma process.

The first light source 51 has an LED for emitting the excitation light (the first light) E having a blue color. The first light source 51 is disposed so as to be opposed to the side surfaces 50c of the wavelength conversion section 50, and emits the excitation light E toward the side surfaces 50c. The excitation wavelength band as the first wavelength band is a blue wavelength band of, for example, 400 nm through 480 nm, and the peak wavelength is, for example, 445 nm. In other words, the excitation light E is blue light. The first light source 51 can be disposed so as to be opposed to some of the four side surfaces 50c of the wavelength conversion section 50, or can also be disposed so as to be opposed to all of the side surfaces 50c.

The first light source 51 has the LED for emitting the excitation light E as the blue light, but can also be provided with other optical members such as a light guide plate, a diffusion plate, or a lens beside the LED. The number of the LED is not particularly limited.

The mirror 55 is provided to the second end part 50b of the wavelength conversion section 50. The mirror 55 reflects the fluorescence Y which has been guided inside the wavelength conversion section 50, and has reached the second end part 50b. The mirror 55 is formed of a metal film or a dielectric multilayer film provided to the second end part 50b of the wavelength conversion section 50.

In the light source device 2 having the configuration described above, when the excitation light E emitted from the first light source 51 enters the wavelength conversion section 50, the phosphor included in the wavelength conversion section 50 is excited, and the fluorescence Y is emitted from an arbitrary light emitting point. The fluorescence Y proceeds from the arbitrary light emitting point toward all directions, but the fluorescence Y having proceeded toward the side surface 50c is totally reflected by the side surface 50c, and then proceeds toward the first end part 50a or the second end part 50b while repeating the total reflection. The fluorescence Y having proceeded toward the first end part 50a enters the angle conversion section 54. Meanwhile, the fluorescence Y having proceeded toward the second end part 50b is reflected by the mirror 55, and then proceeds toward the first end part 50a.

A part of the excitation light E which has not been used for the excitation of the phosphor out of the excitation light E having entered the wavelength conversion section 50 is reflected by the mirror 55 provided to the second end part 50b, and is therefore confined inside the wavelength conversion section 50 and is then reused.

The fluorescence Y generated in the wavelength conversion section 50 enters the angle conversion section 54. The angle conversion section 54 is disposed at the light exit side of the first end part 50a of the wavelength conversion section 50, and functions as a light collection lens for collecting the fluorescence Y emitted from the wavelength conversion section 54. Further, the angle conversion section 54 also has a function as a pickup lens for picking up the fluorescence Y emitted from the wavelength conversion section 50. The angle conversion section 54 is bonded to the first end part 50a of the wavelength conversion section 50 via the bonding layer 59 and is thus held. The angle conversion section 54 is a condensing optical section for collecting the incident light.

The angle conversion section 54 has a first end part 54a opposed to the wavelength conversion section 50, a second end part 54b opposed to the polarization splitting/combining element 53, and side surfaces (reflecting sections) 54c for reflecting the incident light. The side surfaces 54c of the angle conversion section 54 each function as a reflecting section for reflecting the incident light. A part of the light having entered the angle conversion section 54 through the first end part 54a is reflected by the side surfaces 54c as the reflecting section toward the second end part 54b, and thus, the light having entered the angle conversion section 54 from the first end part is collected. Further, a part of the light having entered the angle conversion section 54 through the second end part 54b is reflected by the side surfaces 54c as the reflecting section toward the first end part 54a, and thus, the light having entered the angle conversion section 54 from the second end part 54b is collected.

In the present embodiment, the angle conversion section 54 is formed of a compound parabolic concentrator (CPC). The condensing optical section, namely the angle conversion section 54, is formed of a member made of a light transmissive material higher in refractive index than air such as glass or light transmissive resin. Due to a refractive index difference of the side surfaces 54c of the angle conversion section 54, namely side surfaces of the light transmissive material, from the outside, the light having entered the angle conversion section 54 is reflected. The angle conversion section 54 is enlarged toward the proceeding direction of the light in the cross-sectional area crossing (perpendicular to) an optical axis J1, and thus, the cross-sectional area of the second end part 54b is larger than the cross-sectional area of the first end part 54a. A cross-sectional surface of the side surface 54c along a surface including the optical axis J1 is formed of a paraboloidal surface. It should be noted that an optical axis of the angle conversion section 54 coincides with the optical axis J1 of the wavelength conversion section 50. It is possible to use a taper rod as the angle conversion section 54. When using the taper rod as the angle conversion section 54, it is also possible to obtain substantially the same advantages as those when using the CPC. Further, the angle conversion section 54 is not limited to the configuration described above, but can be provided with a reflecting mirror disposed on the side surface, and in that case, it is possible to adopt a hollow structure in which a mirror is provided to a cylindrical side surface.

The fluorescence Y having entered the angle conversion section 54 having the configuration described above changes the direction to a direction parallel to the optical axis J1 every time the fluorescence Y is totally reflected by the side surfaces 54c while proceeding inside the angle conversion section 54. In such a manner, the angle conversion section 54 makes the maximum emission angle of the fluorescence Y in the second end part 54b smaller than the maximum incident angle of the fluorescence Y in the first end part 54a. In other words, the angle conversion section 54 collimates the fluorescence Y, and then emits the result from the second end part 54b. By collimating and then emitting the fluorescence Y in such a manner, it is possible to increase the light use efficiency in the homogeneous illumination optical system 40 disposed in a posterior stage. It should be noted that it is possible to arrange that the parallelism of the light emitted from the second end part 54b is further improved by disposing a collimator lens at the light exit side of the angle conversion section 54 as needed.

In general, since the etendue of the light defined by a product of the area of the light exit region and the solid angle (the maximum emission angle) of the light is conserved, the etendue of the fluorescence Y is also conserved before and after the transmission through the angle conversion section 54. As described above, the angle conversion section 54 in the present embodiment has the configuration in which the cross-sectional area of the second end part 54b is made larger than the cross-sectional area of the first end part 54a. Therefore, from the viewpoint of the conservation of the etendue, it is possible for the angle conversion section 54 in the present embodiment to make the maximum emission angle of the fluorescence Y in the second end part 54b smaller than the maximum incident angle of the fluorescence Y entering the first end part 54a.

The second light source 52 includes a plurality of semiconductor lasers 52a. Here, when defining a central axis passing through the centers of the first end part 50a and the second end part 50b of the wavelength conversion section 50 as the optical axis J1 of the wavelength conversion section 50, an axis which is perpendicular to the optical axis J1 of the wavelength conversion section 50, and which passes through the center of the polarization splitting/combining element 53 is defined as an optical axis J2 of the second light source 52.

The second light source 52 has a configuration in which the plurality of semiconductor lasers 52a is arranged in an array viewed from a direction of the optical axis J2. Each of the semiconductor lasers 52a emits a blue laser beam Ba in a second wavelength band different from the third wavelength band of the fluorescence Y. The second wavelength band is a blue wavelength band of, for example, 440 nm through 480 nm. It should be noted that the second light source 52 can be formed only of a single semiconductor laser 52a. Hereinafter, the second light source 52 emits blue light (second light) B including a plurality of blue laser beams Ba emitted from the plurality of semiconductor lasers 52a.

The polarization splitting/combining element 53 is disposed at the light exit side of the first end part 50a of the wavelength conversion section 50. The polarization splitting/combining element 53 is disposed so as to form an angle of 45 degrees with the optical axis J1 of the wavelength conversion section 50 and the optical axis J2 of the second light source 52.

The polarization splitting/combining element 53 has a polarization splitting function with respect to the blue light B. Specifically, the polarization splitting/combining element 53 has the polarization splitting function of reflecting an S-polarization component, and transmitting a P-polarization component with respect to the blue light B out of the incident light. On the other hand, the polarization splitting/combining element 53 has a color separation function of transmitting the fluorescence Y as yellow light which has been emitted from the wavelength conversion section 50 and which is different in wavelength band from the blue light B irrespective of the polarization state. Further, in the case of the present embodiment, the blue light B having been emitted from the second light source 52 enters the polarization splitting/combining element 53 as the S-polarization component with respect to the polarization splitting/combining element 53. Therefore, the blue light B having been emitted from the second light source 52 is reflected by the polarization splitting/combining element 53 toward the angle conversion section 54.

In the present embodiment, the diffusion section 57 and the retardation plate 58 are disposed between the polarization splitting/combining element 53 and the dichroic mirror 56 in the light path of the blue light B. In the present embodiment, the retardation plate 58 is provided to the second end part 54b of the angle conversion section 54, and the diffusion section 57 is provided to the first end part 54a of the angle conversion section 54.

The retardation plate 58 is formed of a ¼ retardation plate. Thus, the retardation plate 58 converts the blue light B as the S-polarization component having been reflected by the polarization splitting/combining element 53 into, for example, blue light Bc1 as clockwise circularly polarized light. The blue light Bc1 having been transmitted through the retardation plate 58 enters the angle conversion section 54.

The blue light Bc1 passes through the angle conversion section 54 from the second end part 54b toward the first end part 54a, and then enters the diffusion section 57 provided to the first end part 54a. In the present embodiment, the diffusion section 57 is formed integrally with the angle conversion section 54. The diffusion section 57 is formed of convex structures, concave structures, or concavoconvex structures formed by performing processing such as texture processing or dimple processing. It should be noted that it is desirable for the diffusion section 57 to suppress multiple scattering, and by suppressing the multiple scattering, it is possible to prevent the disturbance in polarization state of the blue light Bc1.

The blue light Bc1 is transmitted through the diffusion section 57, and then enters the bonding layer 59. In the present embodiment, the refractive index of the bonding layer 59 is different from the refractive index of the angle conversion section 54. Therefore, when the blue light Bc1 passes through the diffusion section 57 and then enters the bonding layer 59, the blue light Bc1 is scattered toward a variety of directions due to the refractive index difference between the diffusion section 57 and the bonding layer 59, and the concavoconvex structures. Thus, the blue light Bc1 is diffused by passing through the diffusion section 57.

The blue light Bc1 having been diffused by being transmitted through the diffusion section 57 passes through the bonding layer 59, and then enters the dichroic mirror 56. In other words, the blue light Bc1 enters the dichroic mirror 56 via the retardation plate 58, the angle conversion section 54, and the diffusion section 57.

In the present embodiment, the dichroic mirror 56 is disposed between the polarization splitting/combining element 53 and the wavelength conversion section 50 in the light path of the blue light B. Specifically, the dichroic mirror 56 is disposed between the first end part 50a of the wavelength conversion section 50 and the bonding layer 59. The dichroic mirror 56 is formed of a dielectric multilayer film.

The dichroic mirror 56 reflects the blue light B (the blue light Bc1) emitted from the second light source 52 toward the polarization splitting/combining element 53, and at the same time, transmits the fluorescence Y generated inside the wavelength conversion section 50. The dichroic mirror 56 reflects the light path of the blue light Bc1 as the clockwise circularly polarized light so as to be flipped toward the opposite direction. On this occasion, the blue light Bc1 as the clockwise circularly polarized light is reflected by the dichroic mirror 56 as blue light Bc2 as counterclockwise circularly polarized light.

Further, a part of the excitation light E which has not been used for the excitation of the phosphor out of the excitation light E having entered the wavelength conversion section 50 is reflected by the dichroic mirror 56 provided to the first end part 50a, and is confined inside the wavelength conversion section 50 and is then reused for the generation of the fluorescence Y.

The blue light Bc2 reflected by the dichroic mirror 56 is transmitted through the diffusion section 57 once again to thereby be diffused, and then enters the first end part 54a of the angle conversion section 54. In the present embodiment, since the blue light Bc2 passes through the diffusion section 56 twice, it is possible to reduce the speckle noise due to the blue light B made of a laser beam.

Although not shown in the drawings, the blue light Bc2 changes the direction to a direction parallel to the optical axis J1 every time the blue light Bc2 is totally reflected by the side surfaces 54c while proceeding inside the angle conversion section 54. Therefore, the blue light Bc2 is emitted from the second end part 54b in a collimated state similarly to the fluorescence Y.

When the blue light Bc2 is emitted from the angle conversion section 54, the blue light Bc2 is transmitted once again through the retardation plate 58 provided to the second end part 54b. The blue light Bc2 as the counterclockwise circularly polarized light is converted by the retardation plate 58 into blue light B1 as the P-polarization component. The blue light Bc2 reflected by the dichroic mirror 56 in such a manner passes through the angle conversion section 54 from the first end part 54a toward the second end part 54b, and then enters the polarization splitting/combining element 53 as the blue light B1 as the P-polarization component. In other words, the blue light B1 is collimated by the angle conversion section 54.

The polarization splitting/combining element 53 transmits the blue light B1 as the P-polarization component, and at the same time, transmits the fluorescence Y irrespective of the polarization state. Thus, the polarization splitting/combining element 53 combines the blue light B1 and the fluorescence Y with each other to generate the illumination light (composite light) WL as the white light.

In the light source device 2 having the configuration described above, when the excitation light E emitted from the first light source 51 enters the wavelength conversion section 50, the phosphor included in the wavelength conversion section 50 is excited, and the fluorescence Y is emitted from the arbitrary light emitting point P. The fluorescence Y proceeds from the arbitrary light emitting point P toward all directions, but the fluorescence Y having proceeded toward the side surface 50c is totally reflected by the side surface 50c, and then proceeds toward the first end part 50a or the second end part 50b while repeating the total reflection. The fluorescence Y having proceeded toward the first end part 50a is transmitted through the dichroic mirror 56, and is then diffused by the diffusion section 57, and then enters the angle conversion section 54. The fluorescence Y having entered the angle conversion section 54 is collimated, and then enters the polarization splitting/combining element 53.

Meanwhile, the fluorescence Y having proceeded toward the second end part 50b is reflected by the mirror 55, and then proceeds toward the first end part 50a.

The excitation light E which has not been used for the excitation of the phosphor out of the excitation light E having entered the wavelength conversion section 50 is reflected by the dichroic mirror 56 provided to the first end part 50a and the mirror 55 provided to the second end part 50b, and is therefore confined inside the wavelength conversion section 50 and is thus reused.

In the light source device 2 having the configuration described above, when the blue light B having been emitted from the second light source 52 enters the polarization splitting/combining element 53, the blue light B is reflected by the polarization splitting/combining element 53 as the S-polarized light. The blue light B having been reflected by the polarization splitting/combining element 53 enters the dichroic mirror 56 as the blue light Bc1 via the retardation plate 58, the angle conversion section 54, and the diffusion section 57. The blue light Bc1 is reflected by the dichroic mirror 56 as the blue light Bc2, and the blue light Bc2 is transmitted through the polarization splitting/combining element 53 as the blue light B1 as the P-polarized light via the diffusion section 57, the angle conversion section 54, and the retardation plate 58. The blue light B1 is collimated by the angle conversion section 54, and then enters the polarization splitting/combining element 53.

As a result, the illumination light WL as the white light obtained by combining the fluorescence Y as the yellow light and the blue light B1 with each other is emitted from the light source device 2. The illumination light WL having been emitted from the light source device 2 is collimated by the angle conversion section 54, and therefore proceeds toward the homogeneous illumination optical system 40 as shown in FIG. 1. Then, the illumination light WL homogeneously illuminates the light modulation device 4R, the light modulation device 4G, and the light modulation device 4B as the illumination target areas using the homogeneous optical system 40.

In the case of the present embodiment, since the fluorescence Y as the yellow light is emitted from the wavelength conversion section 50, the blue light B is emitted from the second light source 52, and the illumination light WL as the white light can be obtained by combining the fluorescence Y and the blue light B with each other, it is possible to adjust the white balance of the illumination light WL by adjusting the balance between the light intensity of the fluorescence Y and the light intensity of the blue light B. As a specific adjustment method of the white balance, it is also possible to adopt a configuration in which, for example, the light source device 2 is provided with sensors for respectively detecting the intensity of the fluorescence and the intensity of the blue light, and the electrical power to be supplied to the first light source 51 and the second light source 52 is appropriately controlled in accordance with the deviation of each of the light intensities detected by the sensors from a standard value.

Advantages of Embodiment

According to the light source device 2 related to the present embodiment, the following advantages can be obtained.

The light source device 2 according to the present embodiment is provided with the first light source 51 for emitting the excitation light E, the second light source 52 for emitting the blue light B, the wavelength conversion section 50 including the phosphor, and converting the excitation light E into the fluorescence Y, the polarization splitting/combining element 53 having the polarization splitting function with respect to the blue light B, the dichroic mirror 56 which is disposed between the polarization splitting/combining element 53 and the wavelength conversion section 50 in the light path of the blue light B, which reflects the blue light B toward the polarization splitting/combining element 53, and which transmits the fluorescence Y, the retardation plate 58 disposed between the polarization splitting/combining element 53 and the dichroic mirror 56 in the light path of the blue light B, the diffusion section 57 disposed between the polarization splitting/combining element 53 and the dichroic mirror 56 in the light path of the blue light B, and the angle conversion section 54 which is disposed at the light exit side of the wavelength conversion section 50, and which collects the fluorescence Y emitted from the wavelength conversion section 50 and the blue light B reflected by the dichroic mirror 56. The angle conversion section 54 has the first end part 54a opposed to the wavelength conversion section 50, the second end part 54b opposed to the polarization splitting/combining element 53, and the side surfaces 54c for reflecting the incident light.

The blue light B emitted from the second light source 52 and passing through the polarization splitting/combining element 53 passes through the angle conversion section 54 from the second end part 54b toward the first end part 54a, and then enters the dichroic mirror 56. The blue light Bc2 reflected by the dichroic mirror 56 passes through the angle conversion section 54 from the first end part 54a toward the second end part 54b, and then enters the polarization splitting/combining element 53. The fluorescence Y emitted from the wavelength conversion section 50 passes through the angle conversion section 54 from the first end part 54a toward the second end part 54b, and then enters the polarization splitting/combining element 53. The polarization splitting/combining element 53 combines the blue light B1 reflected by the dichroic mirror and the fluorescence Y emitted from the wavelength conversion section 50 with each other to generate the illumination light WL.

In the light source device 2 according to the present embodiment, it is possible to use the angle conversion section 54 as both of the pickup optical system which makes the blue light B1 reflected by the dichroic mirror 56 enter the polarization splitting/combining element 53 in a collimated manner, and the pickup optical system which makes the fluorescence Y emitted from the wavelength conversion section 50 enter the polarization splitting/combining element 53 in a collimated manner. Thus, it is possible to realize the light source device 2 which can obtain the illumination light WL as the white light with a compact configuration.

Further, in the light source device 2 according to the present embodiment, the diffusion section 57 is provided to the first end part 54a of the angle conversion section 54.

According to this configuration, since it is possible to form the diffusion section 57 integrally with the angle conversion section 54, it is possible to reduce the number of components.

Further, in the light source device 2 according to the present embodiment, the angle conversion section 54 is held by the wavelength conversion section 50 via the bonding layer 59, and the refractive index of the bonding layer 59 is different from the refractive index of the angle conversion section 54.

According to this configuration, since a refractive index difference occurs on the interface between the diffusion section 57 and the bonding layer 59, it is possible to realize the configuration in which the diffusion section 57 is provided to the first end part 54a of the angle conversion section 54.

Further, in the light source device 2 according to the present embodiment, the retardation plate 58 is provided to the second end part 54b of the angle conversion section 54.

According to this configuration, it is possible to provide the retardation plate 58 to the second end part 54b different from the first end part 54a provided with the diffusion section 57. Thus, it becomes easy to perform the assembling manufacture.

Further, in the light source device 2 according to the present embodiment, the retardation plate 58 is a ¼ retardation plate.

According to this configuration, by the blue light B emitted from the second light source 52 passing through the retardation plate 58 twice, it is possible to change the polarization state of the blue light B with respect to the polarization splitting/combining element 53 from the P-polarized light to the S-polarized light. Thus, it is possible for the polarization splitting/combining element 53 to reflect the blue light B emitted from the second light source 52 as the S-polarized light, and transmit the blue light B1 reflected by the dichroic mirror 56 as the P-polarized light. In other words, it is possible to realize the configuration in which the polarization splitting/combining element 53 has the polarization splitting function with respect to the blue light B.

Further, in the light source device 2 according to the present embodiment, the cross-sectional area crossing (perpendicular to) the optical axis J1 of the angle conversion section 54 is enlarged in the direction from the first end part 54a toward the second end part 54b.

According to this configuration, the light having entered the angle conversion section 54 through the first end part 54a changes the direction to a direction parallel to the optical axis J1 every time the light is totally reflected by the side surfaces 54c while proceeding inside the angle conversion section 54. In other words, it is possible for the angle conversion section 54 to collimate the illumination light WL including the fluorescence Y and the blue light B1, and then emit the result from the second end part 54b.

The projector according to the present disclosure is provided with the light source device 2 described above, the light modulation devices 4R, 4G, and 4B for modulating the light from the light source device 2 in accordance with the image information, and the projection optical device 6 for projecting the light modulated by the light modulation devices 4B, 4G, and 4R.

According to the projector 1 related to the present embodiment, since there is provided the light source device 2 described above, it is possible to achieve the reduction in size, and at the same time, the excellent light use efficiency is achieved.

Modified Examples

In the light source device 2 according to the present embodiment, the positions where the diffusion section 57 and the retardation plate 58 are disposed are not particularly limited as long as the positions are located between the polarization splitting/combining element 53 and the dichroic mirror 56 in the light path of the blue light B.

Figure 3:
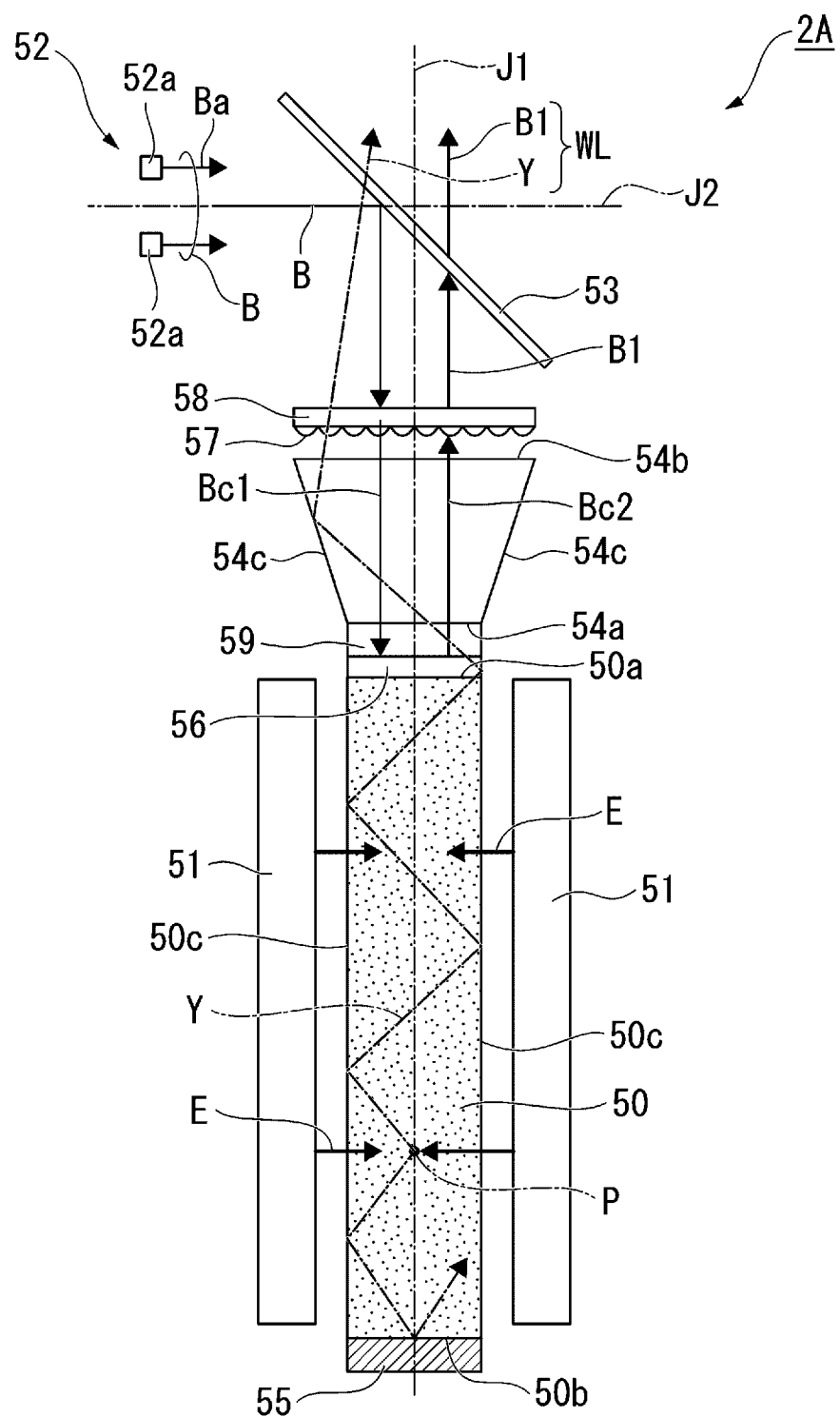
FIG. 3 is an enlarged view of an essential part of a light source device according to a modified example of the first embodiment.

FIG. 3 is an enlarged view of an essential part of a light source device 2A according to a modified example of the first embodiment. In FIG. 3, the constituents common to those shown in FIG. 2 are denoted by the same reference symbols, and the description thereof will be omitted.

As shown in FIG. 3, in the light source device 2A according to the present modified example, the diffusion section 57 and the retardation plate 58 are disposed between the second end part 54b of the angle conversion section 54 and the polarization splitting/combining element 53. In other words, in the present modified example, the diffusion section 57 and the retardation plate 58 are configured separately from the angle conversion section 54.

In the present modified example, the diffusion section 57 is disposed at a position closer to the second end part 54b than the retardation plate 58. The diffusion section 57 is provided to the retardation plate 58. In the light source device 2A according to the present modified example, the diffusion section 57 and the angle conversion section 54 are configured separately from each other. Therefore, since the first end part 54a and the second end part 54b of the angle conversion section 54 can each be formed of a plane, fabrication of the angle conversion section 54 becomes easy.

Further, although in the first embodiment, there is cited when the diffusion section 57 is formed integrally with the first end part 54a of the angle conversion section 54 as an example, it is possible to attach the diffusion section 57 formed as a separate body to the first end part 54a.

Further, in the first embodiment, the configuration of the diffusion section 57 is not particularly limited, and it is possible to adopt a configuration in which, for example, a plurality of types of filler having refractive indexes different from that of the bonding layer 59 is dispersed in the bonding layer 59.

It should be noted that it is possible to dispose only the diffusion section 57 between the second end part 54b of the angle conversion section 54 and the polarization splitting/combining element 53, and dispose the retardation plate 58 at the first end part 54a side of the angle conversion section 54.

Second Embodiment

Subsequently, a light source device according to a second embodiment of the present disclosure will be described. The constituents common to the present embodiment and the first embodiment will be denoted by the same reference symbols, and the detailed description thereof will be omitted.

Figure 4:
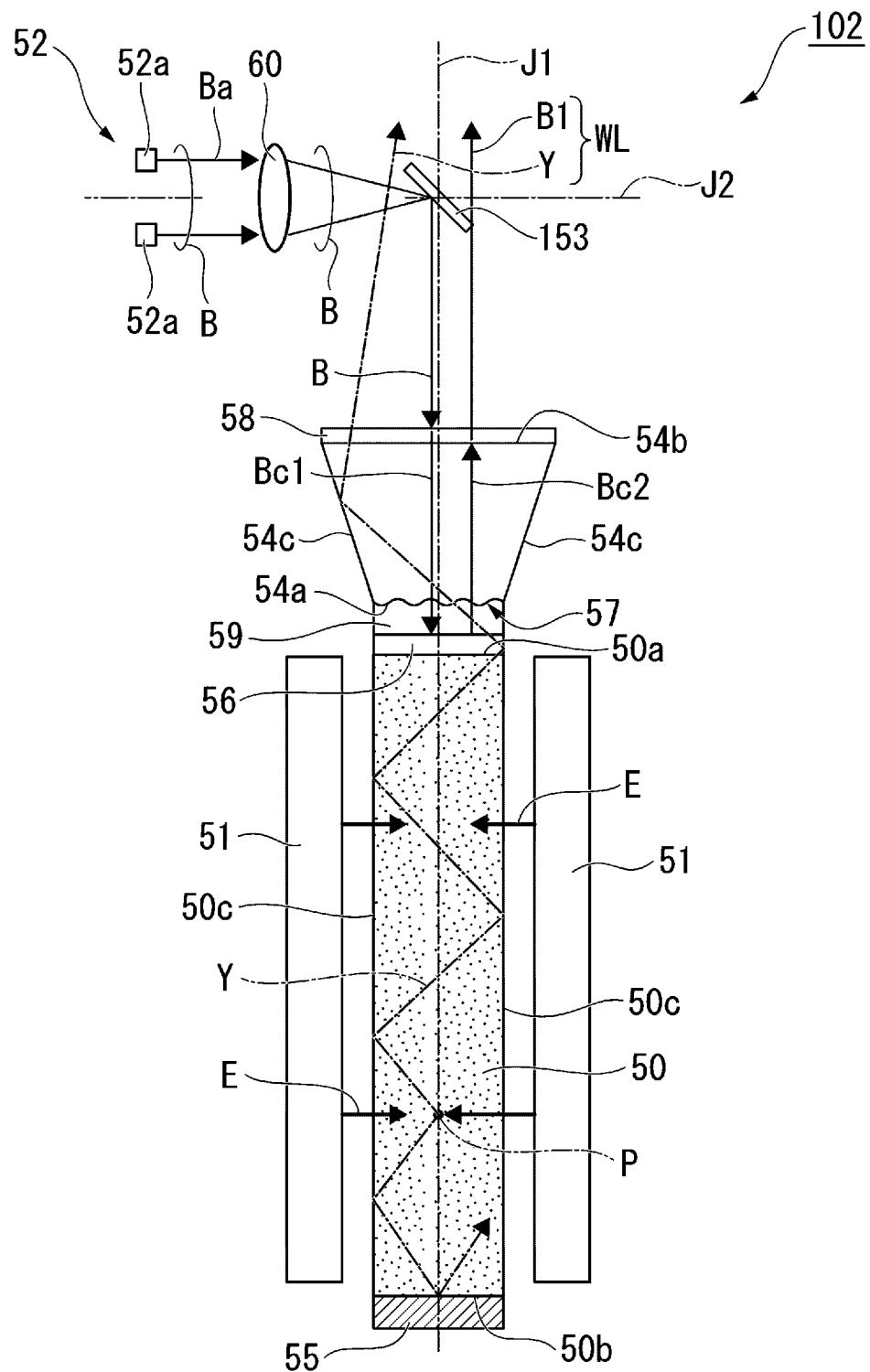
FIG. 4 is a schematic configuration diagram of a light source device according to a second embodiment.

FIG. 4 is a schematic configuration diagram of the light source device 102 according to the present embodiment.

As shown in FIG. 4, the light source device 102 is provided with the wavelength conversion section 50, the first light source 51, the second light source 52, a polarization splitting/combining element 153, the angular conversion section 54, the mirror 55, the dichroic mirror 56, the diffusion section 57, the retardation plate 58, the bonding layer 59, and a condenser lens 60.

In the present embodiment, the blue light B emitted from the second light source 52 enters the condenser lens 60. The condenser lens 60 is formed of, for example, a single convex lens, and makes the blue light B emitted from the second light source 52 enter the polarization splitting/combining element 153 in a condensed state. In other words, the light source device 102 according to the present embodiment is provided with the condenser lens for condensing the blue light B, and the blue light B enters the dichroic mirror 56 in the state of being condensed by the condenser lens 60.

In the light source device 102 according to the present embodiment, since the blue light B enters the polarization splitting/combining element 153 in the state of being condensed by the condenser lens 60, it is possible to reduce the size of the polarization splitting/combining element 153.

Here, the fluorescence Y and the blue light B1 can be transmitted through the polarization splitting/combining element 153, but a considerable amount of loss occurs when being transmitted through the polarization splitting/combining element 153. In contrast, according to the light source device 102 related to the present embodiment, the size of the polarization splitting/combining element 153 is smaller than that of the second end part 54b of the angle conversion section 54 when viewed from the direction along the optical axis J1. Therefore, a part of the light paths of the blue light B1 and the fluorescence Y emitted from the second end part 54b of the angle conversion section 54 is not transmitted through the polarization splitting/combining element 153, but directly enters the homogeneous illumination optical system 40.

According to the light source device 102 related to the present embodiment, since it is possible to suppress the light loss of the blue light B1 and the fluorescence Y caused by being transmitted through the polarization splitting/combining element 153, it is possible to increase the light use efficiency of the homogeneous illumination optical system 40 disposed in the posterior stage.

Third Embodiment

Then, a light source device according to a third embodiment of the present disclosure will be described. The constituents common to the present embodiment and the first embodiment will be denoted by the same reference symbols, and the detailed description thereof will be omitted.

Figure 5:
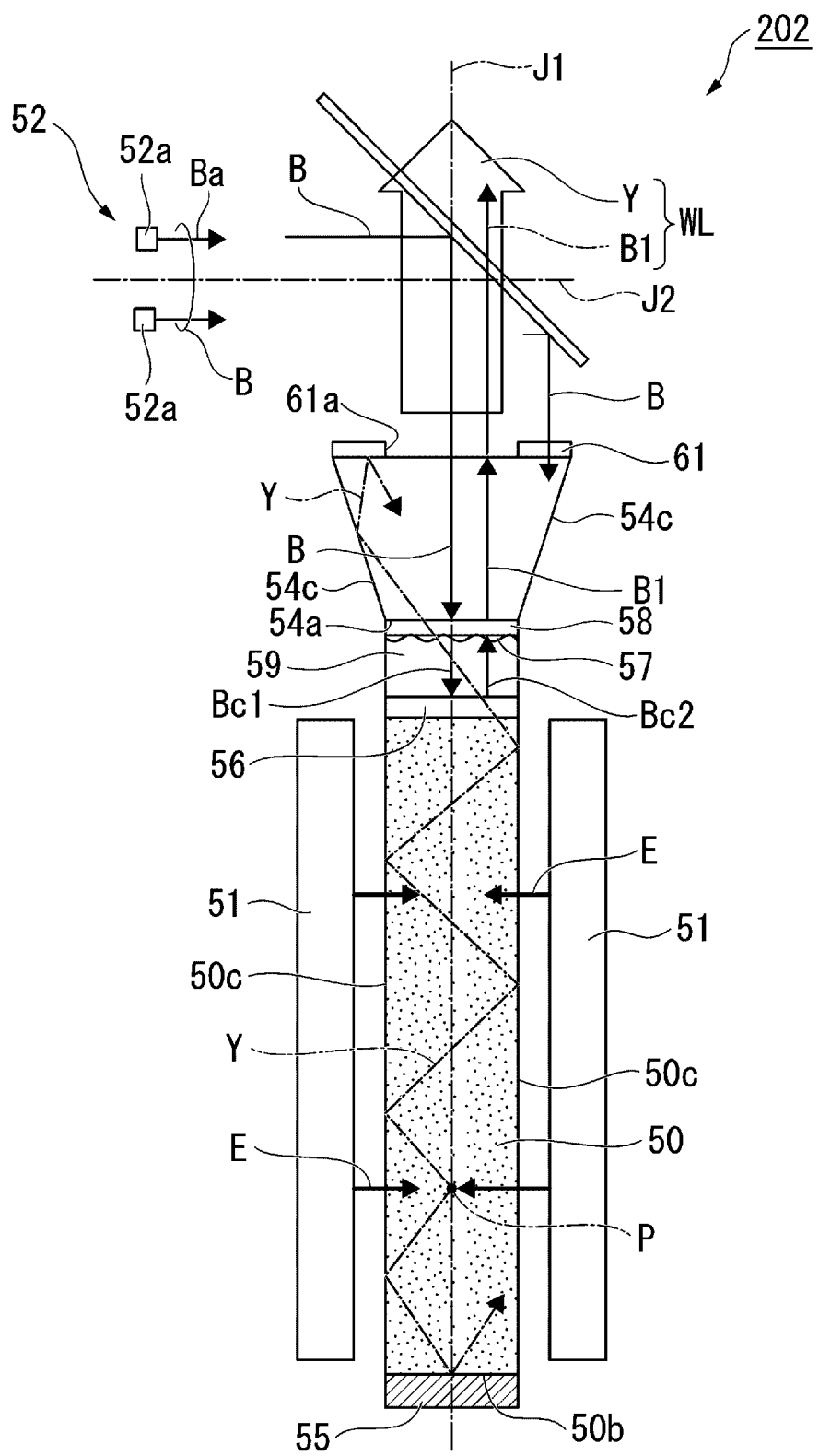
FIG. 5 is a schematic configuration diagram of a light source device according to a third embodiment.

FIG. 5 is a schematic configuration diagram of the light source device 202 according to the present embodiment. In FIG. 5, the second light source 52 is shown in a simplified manner.

As shown in FIG. 5, the light source device 202 is provided with the wavelength conversion section 50, the first light source 51, the second light source 52, the polarization splitting/combining element 53, the angular conversion section 54, the mirror 55, the dichroic mirror 56, the diffusion section 57, the retardation plate 58, the bonding layer 59, the condenser lens 60, and a dichroic mirror (another dichroic mirror) 61.

In the light source device 202 according to the present embodiment, the diffusion section 57 and the retardation plate 58 are provided to the first end part 54a of the angle conversion section 54. In the present embodiment, the diffusion section 57 and the retardation plate 58 are configured separately from the angle conversion section 54. The diffusion section 57 is disposed at a position closer to the wavelength conversion section 50 than the retardation plate 58.

In the present embodiment, the blue light B having entered the angle conversion section 54 enters the dichroic mirror 56 as the blue light Bc1 via the retardation plate 58 and the diffusion section 57. The blue light Bc1 is reflected by the dichroic mirror 56 as the blue light Bc2, and the blue light Bc2 is transmitted through the polarization splitting/combining element 53 as the blue light B1 as the P-polarized light via the diffusion section 57, the retardation plate 58, and the angle conversion section 54. The blue light B1 is collimated by the angle conversion section 54, and then enters the polarization splitting/combining element 53.

In the light source device 202 according to the present embodiment, the dichroic mirror 61 is disposed between the polarization splitting/combining element 53 and the angle conversion section 54 in the light path of the blue light B. The dichroic mirror 61 is disposed in a part of the light path of the fluorescence Y emitted from the angle conversion section 54. The dichroic mirror 61 is provided to the second end part 50b of the wavelength conversion section 50.

The dichroic mirror 61 is formed of a dielectric multilayer film. The dichroic mirror 61 has a property of reflecting the fluorescence Y generated inside the wavelength conversion section 50, and at the same time, transmitting the blue light B. The fluorescence Y having been reflected by the dichroic mirror 61 returns to the wavelength conversion section 50, and is then recycled.

Figure 6:
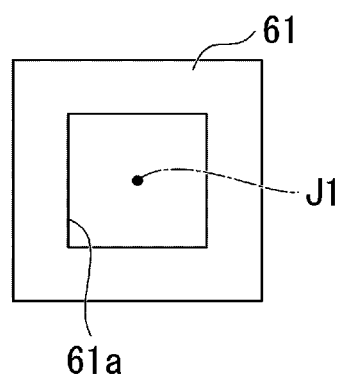
FIG. 6 is a plan view of a dichroic mirror in the third embodiment.

FIG. 6 is a plan view of the dichroic mirror 61 viewed from a direction along the optical axis J1.

As shown in FIG. 6, the dichroic mirror 61 has an opening 61a. The size of the opening 61a of the dichroic mirror 61 is smaller than the size of the second end part 54b of the angle conversion section 54. Therefore, in the light source device 202 according to the present embodiment, by providing the dichroic mirror 61 to the second end part 54b of the angle conversion section 54, it is possible to make the area of the light exit region of the fluorescence Y smaller compared to when the dichroic mirror 61 is not provided. Therefore, it is possible for the light source device 202 to reduce the etendue of the fluorescence Y.

Further, in the light source device 202 according to the present embodiment, since the fluorescence Y is reciprocated between the dichroic mirror 61 and the wavelength conversion section 50 to thereby be emitted only from the opening 61a, it is possible to increase the light density of the fluorescence Y.

As described above, according to the light source device 202 related to the present embodiment, it is possible to efficiently use the fluorescence Y by reducing the etendue of the fluorescence Y. Further, by increasing the light density of the fluorescence Y, it is possible to generate the illumination light WL high in luminance.

Fourth Embodiment

Then, a light source device according to a fourth embodiment of the present disclosure will be described. The constituents common to the present embodiment and the third embodiment will be denoted by the same reference symbols, and the detailed description thereof will be omitted.

Figure 7:
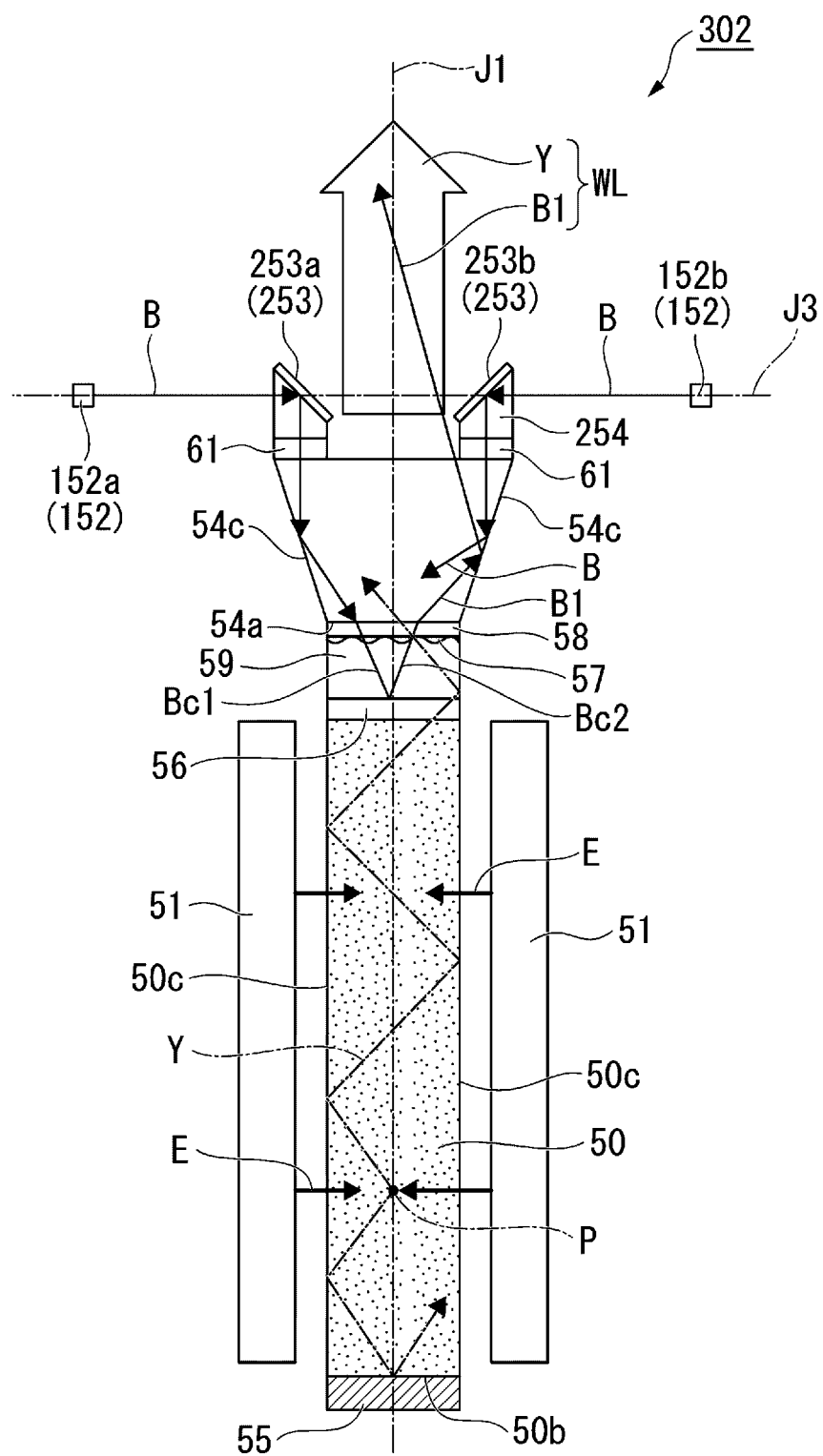
FIG. 7 is a schematic configuration diagram of a light source device according to a fourth embodiment.

FIG. 7 is a schematic configuration diagram of the light source device 302 according to the present embodiment.

As shown in FIG. 7, the light source device 302 is provided with the wavelength conversion section 50, the first light source 51, a second light source 152, a polarization splitting/combining element 253, the angular conversion section 54, the mirror 55, the dichroic mirror 56, the diffusion section 57, the retardation plate 58, the bonding layer 59, the condenser lens 60, and the dichroic mirror (another dichroic mirror) 62.

The second light source 152 in the present embodiment includes a pair of light source sections 152a, 152b.

In the light source device 302 according to the present embodiment, the pair of light source sections 152a, 152b are arranged across the optical axis J1 from each other. The pair of light source sections 152a, 152b are disposed so as to be opposed to each other. It should be noted that optical axes J3 of the respective light source sections 152a, 153b coincide with each other. The optical axes J3 are perpendicular to the optical axis J1. Each of the light source sections 152a, 152b has a configuration in which a plurality of semiconductor lasers (not shown) is arranged in an array viewed from a direction of the optical axis J3.

The polarization splitting/combining element 253 in the present embodiment includes a pair of polarization splitting mirrors 253a, 253b. It should be noted that the polarization splitting mirrors 253a, 253b have the same optical characteristics as those of the polarization splitting/combining element 53 in the embodiments described above except the size.

In the light source device 302 according to the present embodiment, the polarization splitting mirrors 253a, 253b correspond respectively to the light source sections 152a, 152b. The polarization splitting mirror 253a is disposed so as to form an angle of 45 degrees with the optical axis J1 of the wavelength conversion section 50 and the optical axis J3 of the light source section 152a. Similarly, the polarization splitting mirror 253b is disposed so as to form an angle of 45 degrees with the optical axis J1 of the wavelength conversion section 50 and the optical axis J3 of the light source section 152b. It should be noted that the polarization splitting mirrors 253a, 253b are each provided to the dichroic mirror 61 via a prism member 254.

The blue light B emitted from the light source section 152a is reflected by the polarization splitting mirror 253a toward the angle conversion section 54, and the blue light B emitted from the light source section 152b is reflected by the polarization splitting mirror 253b toward the angle conversion section 54.

Figure 8:
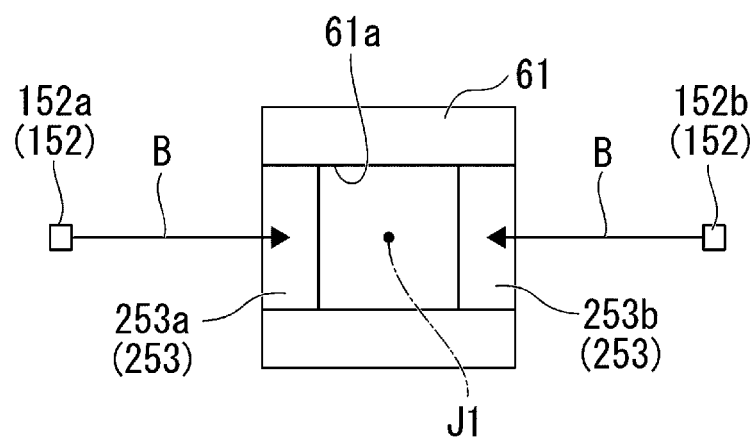
FIG. 8 is a plan view of a light source device according to a fourth embodiment.

FIG. 8 is a plan view of the light source device 302 viewed from a direction along the optical axis J1.

As shown in FIG. 8, the polarization splitting/combining element 253 is disposed so as to correspond to a non-formation area of the opening 61*a* in the dichroic mirror 61. Specifically, the polarization splitting mirrors 253*a*, 253*b* are disposed so as not to overlap the opening 61*a* of the dichroic mirror 61. In other words, the polarization splitting/combining element 253 does not overlap the opening 61*a* of the dichroic mirror 61 which functions as a light exit opening for the fluorescence Y.

Here, the fluorescence Y can be transmitted through the polarization splitting mirrors 253*a*, 253*b* constituting the polarization splitting/combining element 253, but causes a considerable loss when being transmitted through the polarization splitting mirrors 253*a*, 253*b*. In contrast, according to the light source device 302 related to the present embodiment, since the polarization splitting/combining element 253 does not overlap the opening 61*a* as the light exit opening for the fluorescence Y, the fluorescence Y emitted from the opening 61*a* of the dichroic mirror 61 directly enters the homogeneous illumination optical system 40 without being transmitted through the polarization splitting/combining element 253.

Therefore, according to the light source device 302 related to the present embodiment, since it is possible to suppress the light loss of the fluorescence Y caused by being transmitted through the polarization splitting/combining element 253, it is possible to increase the light use efficiency of the homogeneous illumination optical system 40 disposed in the posterior stage.

It should be noted that the scope of the present disclosure is not limited to the embodiments described above, but a variety of modifications can be provided thereto within the scope or the spirit of the present disclosure.

For example, although in the embodiments described above, there is described the example when applying the light source device according to the present disclosure to the transmissive type projector, the light source device according to the present disclosure can also be applied to a reflective type projector. Here, the "transmissive type" means that the liquid crystal light valve including the liquid crystal panel and so on has a configuration of transmitting the light. The "reflective type" means that the liquid crystal light valve has a configuration of reflecting the light. It should be noted that the light modulation device is not limited to the liquid crystal light valve, but it is also possible to use, for example, a digital micromirror device.

Further, although in the embodiments described above, there is cited the example of the projector using the three liquid crystal panels, the present disclosure can also be applied to a projector using one liquid crystal light valve alone or a projector using four or more liquid crystal light valves.

Further, although in the embodiments described above, there is described the example of installing the light source device according to the present disclosure in the projector, this is not a limitation. The light source device according to the present disclosure can also be applied to lighting equipment, a headlight of a vehicle, and so on.

What is claimed is:

1. A light source device comprising:
a first light source configured to emit first light having a first wavelength band;
a second light source configured to emit second light having a second wavelength band;
a wavelength conversion section which includes a phosphor, and which is configured to convert the first light emitted from the first light source into third light in a third wavelength band different from the first wavelength band;
a polarization splitting/combining element which is disposed in a light path of the second light, and which has a polarization splitting function with respect to the second light;
a dichroic mirror configured to reflect the second light which is emitted from the second light source and which proceeds via the polarization splitting/combining element, and transmit the third light emitted from the wavelength conversion section;
a retardation plate disposed between the polarization splitting/combining element and the dichroic mirror in the light path of the second light;
a diffusion section disposed between the polarization splitting/combining element and the dichroic mirror in the light path of the second light; and
a condensing optical section configured to collect the third light which is emitted form the wavelength conversion section and is transmitted through the dichroic mirror, and the second light reflected by the dichroic mirror, wherein
the condensing optical section includes
a first end part,
a second end part, and
a reflecting part configured to reflect incident light,
the second light which is emitted from the second light source and proceeds via the polarization splitting/combining element enters the condensing optical section through the second end part, passes through the condensing optical section, and is emitted from the first end part, and enters the dichroic mirror,
the second light which is reflected by the dichroic mirror enters the condensing optical section through the first end part, passes through the condensing optical section, and is emitted from the second end part, and enters the polarization splitting/combining element,
the third light which is emitted from the wavelength conversion section and is then transmitted through the dichroic mirror enters the condensing optical section through the first end part, passes through the condensing optical section, and is emitted from the second end part, and enters the polarization splitting/combining element, and
the polarization splitting/combining element combines the second light reflected by the dichroic mirror and the third light emitted from the wavelength conversion section with each other to generate composite light.

2. The light source device according to claim 1, wherein the diffusion section is provided to the first end part of the condensing optical section.

3. The light source device according to claim 2, wherein the condensing optical section is held by the wavelength conversion section via a bonding layer, and
the bonding layer is different in refractive index from the condensing optical section.

4. The light source device according to claim 2, wherein the retardation plate is provided to the second end part of the condensing optical section.

5. The light source device according to claim 1, wherein at least one of the retardation plate and the diffusion section is disposed between the second end part of the condensing optical section and the polarization splitting/combining element.

6. The light source device according to claim 1, further comprising:
a condenser lens configured to condense the second light, wherein the second light enters the polarization splitting/combining element in a state of being condensed by the condenser lens.

7. The light source device according to claim 1, wherein the retardation plate is a ¼ retardation plate.

8. The light source device according to claim 1, wherein the condensing optical section is enlarged in a cross-sectional area crossing an optical axis in a direction from the first end part toward the second end part.

9. The light source device according to claim 1, further comprising:
   another dichroic mirror disposed between the polarization splitting/combining element and the condensing optical section in the light path of the second light, wherein
   the another dichroic mirror is disposed in a part of a light path of the third light emitted from the wavelength conversion section, reflects the third light, and transmits the second light.

10. The light source device according to claim 9, wherein the another dichroic mirror is provided to the second end part of the condensing optical section.

11. The light source device according to claim 9, wherein the another dichroic mirror has an opening, and
   the polarization splitting/combining element is disposed so as to correspond to a non-formation area of the opening in the another dichroic mirror.

12. A projector comprising:
   the light source device according to claim 1;
   a light modulation device configured to modulate light from the light source device in accordance with image information; and
   a projection optical device configured to project the light modulated by the light modulation device.

* * * * *